United States Patent
Kaeb et al.

(10) Patent No.: US 11,787,648 B2
(45) Date of Patent: Oct. 17, 2023

(54) GRAIN BIN UNLOADING CONVEYOR SYSTEM

(71) Applicant: Illinois Grain and Seed, Inc., Cissna Park, IL (US)

(72) Inventors: Todd W. Kaeb, Cissna Park, IL (US); Andrew L. Stock, Cissna Park, IL (US); James K. Enz, Claytonville, IL (US)

(73) Assignee: Illinois Grain & Seed, Inc., Cissna Park, IL (US)

( * ) Notice: Subject to any disclaimer, the term of this patent is extended or adjusted under 35 U.S.C. 154(b) by 449 days.

(21) Appl. No.: 16/949,009

(22) Filed: Oct. 9, 2020

(65) Prior Publication Data

US 2021/0024304 A1    Jan. 28, 2021

Related U.S. Application Data

(62) Division of application No. 16/552,674, filed on Aug. 27, 2019, now Pat. No. 10,836,590.

(60) Provisional application No. 62/724,125, filed on Aug. 29, 2018.

(51) Int. Cl.

| | |
|---|---|
| *B65G 21/06* | (2006.01) |
| *B65G 21/02* | (2006.01) |
| *B65G 21/08* | (2006.01) |
| *B65G 21/10* | (2006.01) |
| *B65G 65/42* | (2006.01) |

(52) U.S. Cl.
CPC ............ *B65G 65/42* (2013.01); *B65G 21/02* (2013.01); *B65G 21/08* (2013.01); *B65G 21/10* (2013.01); *B65G 21/105* (2013.01); *B65G 2201/042* (2013.01)

(58) Field of Classification Search
CPC ........ B65G 21/02; B65G 21/06; B65G 21/08; B65G 21/10; B65G 21/105; B65G 65/42
USPC .......... 198/540, 547, 549, 832, 860.1, 860.5
See application file for complete search history.

(56) References Cited

U.S. PATENT DOCUMENTS

| | | | |
|---|---|---|---|
| 3,844,404 A | 10/1974 | Emmenegger | |
| 3,856,135 A | 12/1974 | Hayakawa et al. | |
| 3,878,936 A | 4/1975 | Niggemyer | |
| 4,643,294 A | 2/1987 | Whited | |
| 4,714,151 A | 12/1987 | Campbell et al. | |
| 6,752,261 B1 * | 6/2004 | Gaeddert ............. | B65G 21/105 198/813 |

(Continued)

FOREIGN PATENT DOCUMENTS

CA          2492676 C     10/2009

OTHER PUBLICATIONS

US 2007/0248294 A1, Jager, Oct. 25 (Year: 2007).*

*Primary Examiner* — Douglas A Hess
(74) *Attorney, Agent, or Firm* — Coughlin Law Office LLC; Daniel J . Coughlin; Stuart M. Aller

(57) ABSTRACT

An unloading conveyor system for unloading grain through the floor of a grain bin. A removeable cover is vertically supported by the plurality of ribs to cover the span of the midpan to allow maintenance. The midpan comprises a plurality of slots and ledges to receive and support the ribs to allow easy installation and maintenance. A central pit having an internal portion and an access support wall also provides easy installation and maintenance. The first bearing mount, second bearing mount, and roller are all accessible for service through the internal portion of the central pit.

20 Claims, 8 Drawing Sheets

(56) References Cited

U.S. PATENT DOCUMENTS

| | | | |
|---|---|---|---|
| 7,497,325 B2 | 3/2009 | Simoens et al. | |
| 7,544,031 B2 | 6/2009 | Kaeb et al. | |
| 7,588,405 B2 | 9/2009 | Johnson et al. | |
| 7,886,897 B2 | 2/2011 | Johanssen | |
| 8,770,388 B1 | 7/2014 | Chaon et al. | |
| 9,181,033 B2 * | 11/2015 | Stenson | B65G 15/44 |
| 10,500,689 B2 * | 12/2019 | Cheng | B65G 23/04 |
| 10,836,590 B2 * | 11/2020 | Kaeb | B65G 21/08 |
| 11,325,794 B2 * | 5/2022 | Kaeb | B65G 21/08 |
| 11,535,455 B1 * | 12/2022 | Ertel | B65G 21/105 |

* cited by examiner

GRAIN BIN UNLOADING CONVEYOR SYSTEM

CROSS REFERENCES

This application is a division of application Ser. No. 16/552,674 filed on Aug. 27, 2019, which application claims priority of U.S. Provisional Application No. 62/724,125 filed Aug. 29, 2018.

FIELD OF INVENTION

The present invention relates to unloading conveyor systems for agricultural grain storage bins, and, more particularly, to conveyors mounted in a channel in the floor of a bin or under a raised floor of a bin being fed by a series of radially spaced openings or wells formed in the floor, through which grain is delivered to the conveyor by gravity, in collaboration with a sweep conveyor that rotates about a central pivot point of the bin to direct residual grain into one or more of the wells in the floor.

BACKGROUND

Seed and grain are commonly stored in grain bins and related storage structures. Grain storage structures—such as grain bins—commonly utilize a concrete foundation providing a foundation on which a series of formed steel rings (i.e. corrugated cylindrical sections) are joined and extend upward to form a cylindrical tank. Many such grain bins have perforated steel floors supported on the concrete foundation and spaced above the floor of the foundation, for purposes of passing air upwardly through the stored grain for aeration of the grain to control the drying and moisture content of the grain, preserve the grain, and reduce loss.

Horizontal unloading augers have been principally used in the past to remove the grain from the bin. These augers are placed between the concrete foundation and the perforated steel floor or in a trough formed in the foundation. The augers extend from the center of the bin through the side wall to several feet outside the bin for discharge into another mass flow auger or conveyor for subsequent transport to market or other use. The unloading auger carries grain away from an enclosed metal frame—a well—at the center of the grain bin. The grain flows via gravity through the center well into the auger. The center well typically has a moveable slide gate which can be operated from outside the grain bin to control grain flow through the well.

Eventually the bin empties to the point where no additional grain can flow under gravity into the center well, leaving residual grain on the outer edges of the floor of the grain bin extending from the center well and sloping upwards to the outer wall of the bin. The remaining grain, referred to as the residual grain, is considerable, rising from a few inches near the center to as much as ten or twelve feet at the outer wall, for larger diameter bins. The valuable residual grain is commonly removed from the bin via a powered horizontal sweep auger. This powered horizontal sweep auger rests on the perforated floor and may be placed over the unloading auger prior to filling the grain bin. Commonly, additional secondary wells are placed over the unloading auger to remove grain from around the powered horizontal sweep auger so it is free of the residual grain pile prior to commencing its rotary "sweep" operation. Power to the sweep is either transferred from the unload conveyor— as described in U.S. Pat. No. 7,544,031—or the sweep is powered with a dedicated electric motor, or equivalent power source. The sweep conveyor transfers power from the power source, through the auger or chain to turn an idler roller. The idler roller is coupled to a distal drive wheel such that power is transferred from the conveyor to the drive wheel. The driven wheel is mounted perpendicular to the length of the sweep conveyor and drives the sweep about the pivot point, like the hand of a clock.

Recent improvements have been made to grain bin unloading systems for purposes of reducing damage to grain. This damage is related to the clearance fit and steel flighting used in conventional unloading auger systems. Belt conveyors fitted under the perforated grain bin floor in place of auger unloading systems are now being employed to minimize damage to high value seed, as well as to improve energy efficiency and reduce unload time.

The belt conveyor is positioned under the perforated metal grain bin floor and may employ additional intermediate wells for removal of residual grain to clear the region about the power sweep before it is actuated. The drive roller typically employs a bonded rubber coating to provide sufficient traction to transmit power to the conveyor belt.

BRIEF DESCRIPTION

We recognized that removeable cover plates would allow maintenance access to the belt without removing the belt from the conveyor system. These removeable cover plates span across the trough or gap in a raised floor system. The removeable cover plates must be reinforced to support the weight of the grain and the sweep conveyor. The removeable cover plates are vertically supported by a plurality of ribs that extend along an axis perpendicular to the longitudinal axis of the horizontal bin unload conveyor. The ribs incorporate a tab that is received into the midpan to maintain proper spacing of the ribs sufficient to support the removeable cover plates.

We also recognized that providing an overlap flange on the removeable cover plates prevents grain from entering the midpan. The overlap flange covers the raised bin floor and extends over the external ledge to cover a portion of the raised bin floor to provide a seal. The overlap flange also provides a convenient place for securing the cover to the return trough.

We also recognized that ribs incorporating a rib end having a first rib support flange and a second rib support flange would prevent the ribs from falling over during the installation or maintenance. The rib ends have a first rib support flange and a second rib support flange that extend parallel to the longitudinal axis of the horizontal bin unload conveyor when the ribs are installed. This provides support to maintain the ribs in a vertical orientation when the tab is received into the tab slot.

We also recognized that a removable midpan can support the conveyor during transfer of the material from the bin. The removable midpan is suspended within the return trough and provides a separation between the outgoing, full portion of the conveyor belt from the returning, empty portion of the conveyor belt. The ribs span across the midpan to allow the outgoing and full portion of the conveyor belt to pass underneath the ribs. The rib tabs are inserted into respective tab slots appropriately spaced apart longitudinally along the horizontal bin unload conveyor.

In order to operate the well gates or the clutch for the sweep conveyor drive mechanism, a control rod extends longitudinally through the horizontal bin unload conveyor. In order to accommodate the control rod, the ribs incorporate a notch in the exterior side of a rib end. The notch allows the control rod to move along the peripheral interior portion of the midpan. The midpan is configured with various ledges to support the ribs and the control rod.

One limitation of current systems is the roller, ball bearing mounts, and clutch system are located internal of the bin at or near the center well of the grain bin. This makes maintenance on the rollers, ball bearing mounts, and clutch system exceedingly difficult. Existing systems require the raised floor be removed in order to access the bearings and to remove the roller. We recognized that the roller, ball bearing mounts, and clutch system could be more easily maintained by providing a side access portion to the center well. Additionally, a second bearing mount is mounted to the interior of the center well. In this way, the service parts are accessible within the center well and can be maintained without removing the raised floor. This access also allows the user to maintain the belt, such as splicing the belt, without removing the belt from the horizontal bin unload conveyor and without removing the raised floor.

We also recognized that longitudinal risers could be attached to the floor of the return trough to prevent the return portion of the conveyor belt from freezing or otherwise binding up on the bottom of the return trough. It is common for grain bins to be unloaded in the winter, and any residual moisture may descend to the bottom of the return trough. This moisture may freeze, causing the belt to bind up. This can damage the belt. By attaching risers that run along the longitudinal axis of the return trough, the belt is supported and does not make sufficient contact with the return trough to bind up. The return portion of the belt moves along the top of the risers.

We also recognized that a generally U-shaped backstop mounted adjacent to the roller at the end of the transition assembly can prevent grain from backflowing into the center well and the return trough. Belt conveyors are more susceptible to material interposed between the belt and the roller causing interference with the proper operation of the belt conveyor. The backstop has a lower profile that matches the shape of the bottom of the transition piece. The backstop has a central slot that allows the belt to pass through. The edges of the backstop rise up, generally perpendicular to the edges of the belt. In this way, the openings around the belt—other than directly above the belt surface—are minimized.

BRIEF DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
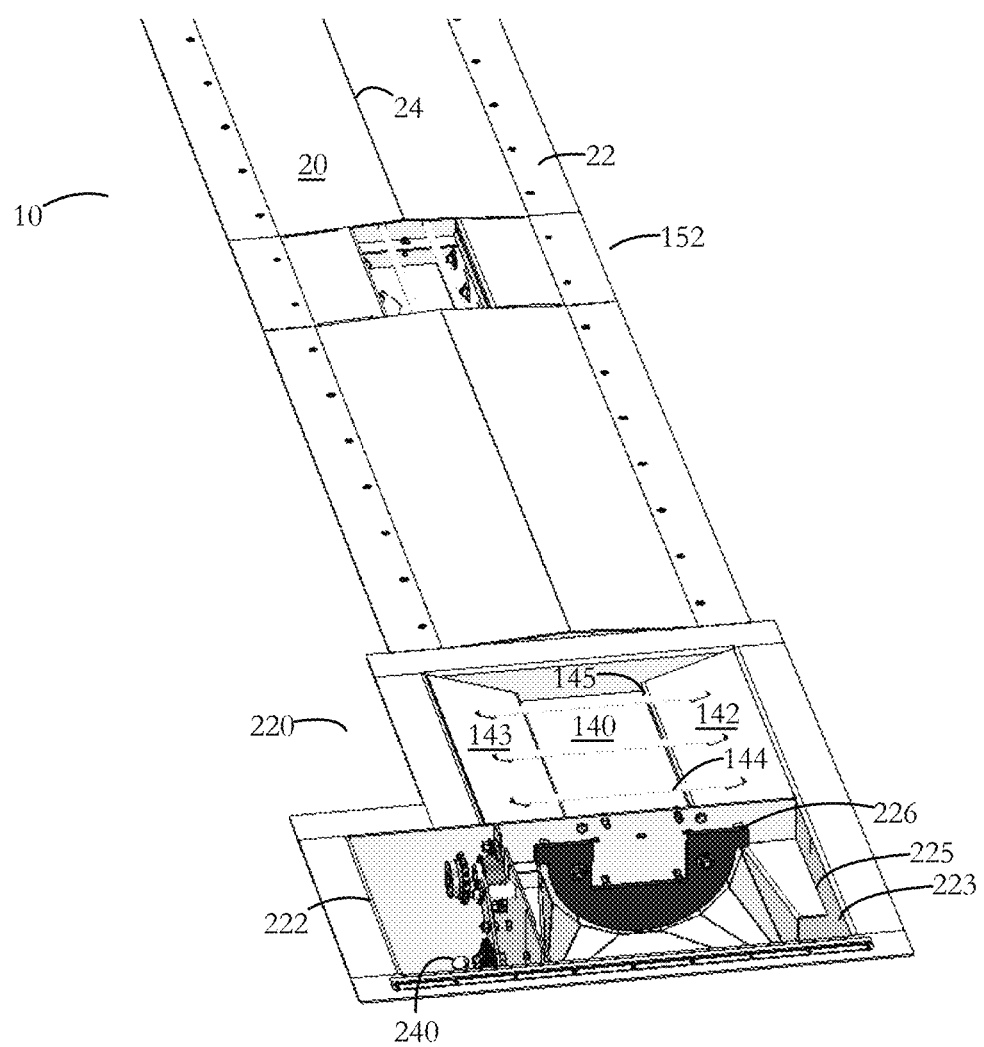
FIG. 1 shows a top perspective view of a bin unload belt conveyor extending from a center well, wherein the cover is mounted.

FIG. 1 shows a portion of an unloading conveyor system having a bin unload conveyor 10 capable of being installed in a grain bin. The bin unload conveyor 10 is installed in the floor of a grain bin and extends radially from the bin center to the peripheral bin wall. The bin unload conveyor 10 is mounted in the floor of a grain bin. The bin unload conveyor 10 may be mounted within a channel in the floor of a bin. Alternatively, the bin unload conveyor 10 may be mounted to a raised floor of a bin. The bin unload conveyor 10 is fed by a series of radially spaced openings or wells formed in a floor. The grain is delivered through these openings to the bin unload conveyor 10 by gravity. A sweep conveyor can complement the bin unload conveyor 10 by directing residual grain into one or more of the wells in the floor. The sweep conveyor rotates about a central pivot point of the bin upon the floor of the grain bin. For this reason, the top of the bin unload conveyor 10 cannot interfere with the movement of the sweep conveyor.

In order to facilitate rapid access to the bin unload conveyor 10, a cover 20 is removably mounted to cover the bin unload conveyor. The cover 20 provides a top surface of the bin unload conveyor over which the sweep conveyor can travel over. The cover 20 is illustrated as pitched, having a central peak 24. The cover 20 prevents grain from entering at points along the bin unload conveyor 10 other than through the gated pit areas.

Figure 2:
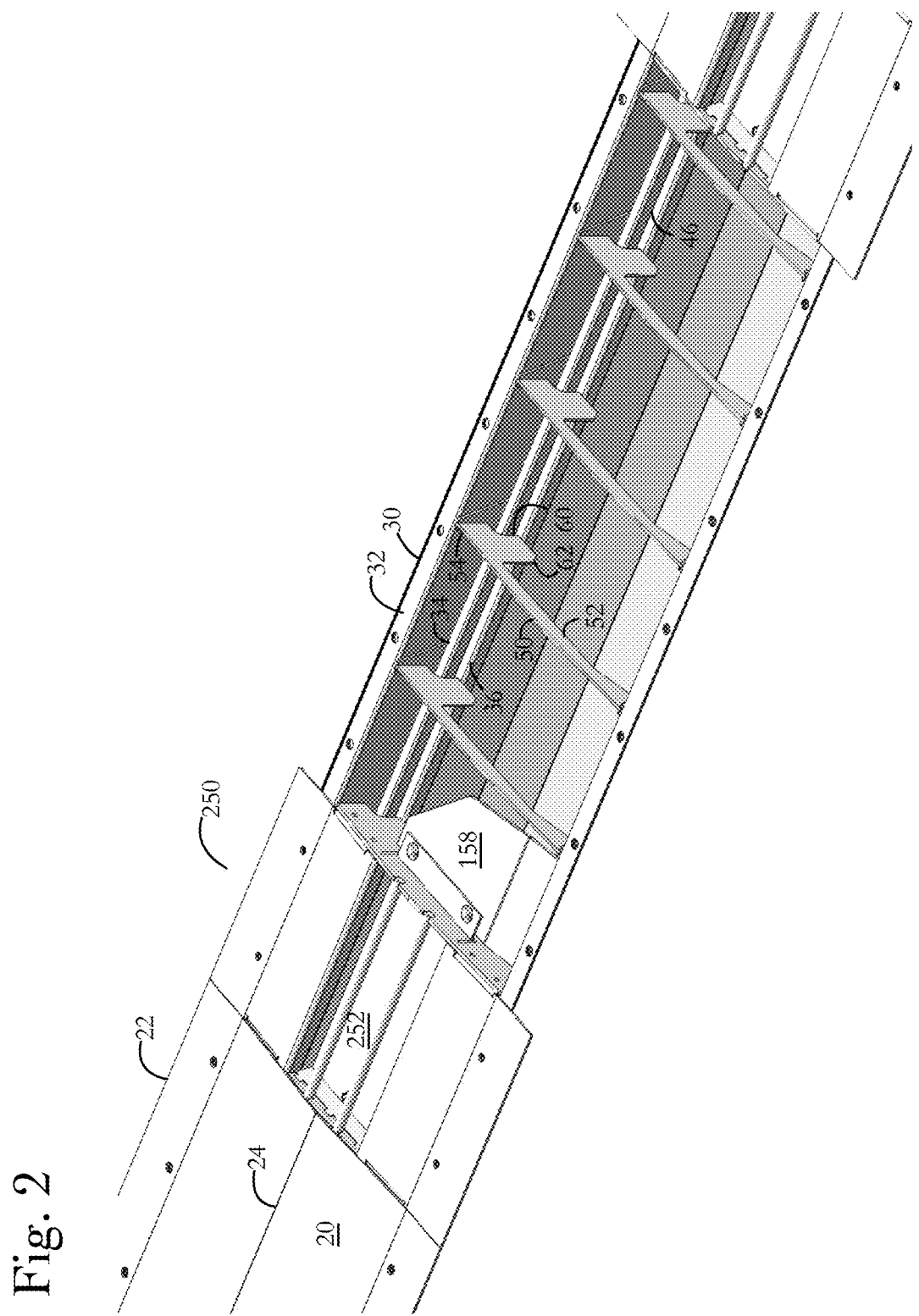
FIG. 2 shows a top side perspective view of the conveyor of FIG. 1, wherein a cover portion has been removed to show a plurality of ribs extending across a lateral portion of the midpan.

FIG. 2 shows the internal components that support the bin unload conveyor belt and provide vertical support for the cover 20. A midpan 30 supports a portion of the conveyor belt 5 transporting the grain traveling out of the grain bin. The midpan 30 has a curvilinear bottom for support the conveyor belt 5 and the load contained on the conveyor belt. The midpan 30 has a first internal ledge 34 and a second internal ledge 36 for supporting a plurality of ribs 50. The ribs 50 have a truss portion 52 that provides vertical support for the cover 20. Each rib 50 has a rib end 54 that extends perpendicular from the truss portion 52 of the rib. The rib end 54 extends outwardly to form a first rib support flange 56 and a second rib support flange 57. As illustrated, the first rib support flange 56 and the second rib support flange 57 is illustrated as having a triangular shape, which prevents the rib 50 from tipping over during the installation or removal of the cover 20. A notch 60 is formed in an exterior side of the rib end 54, between the rib end 54 and a rib foot 62. The rib foot 62 extends downwardly to the second internal ledge 36. The notch 60 allows a control rod 46 to pass through along the longitudinal axis of the bin unload conveyor 10. The control rod 46 operates the clutch mechanism 242 for engaging the sweep drive assembly 240, which transfers power from the roller 228 to the sweep drive sprocket 241.

Also shown in FIG. 2, the cover 20 has an overhang flange 22 that extends beyond the first external ledge 32 and second external ledge 33 of the midpan 30. The overhang flange 22 extends along the plane of the top of the grain bin floor. The overhang flange 22 prevents grain, dust, and debris from entering the bin unload conveyor 10. The cover 20 may be mounted to the midpan 30 or the return trough 40 by passing a fastener through the overhang flange 22. A cover 20 with an overhang flange 22 is advantageous as the bin unload conveyor is operated while covered with grain. In order to maintain operation of the bin unload conveyor, the flow of grain from the bin into the conveyor must be regulated—which is accomplished by the gated wells.

Figure 3:
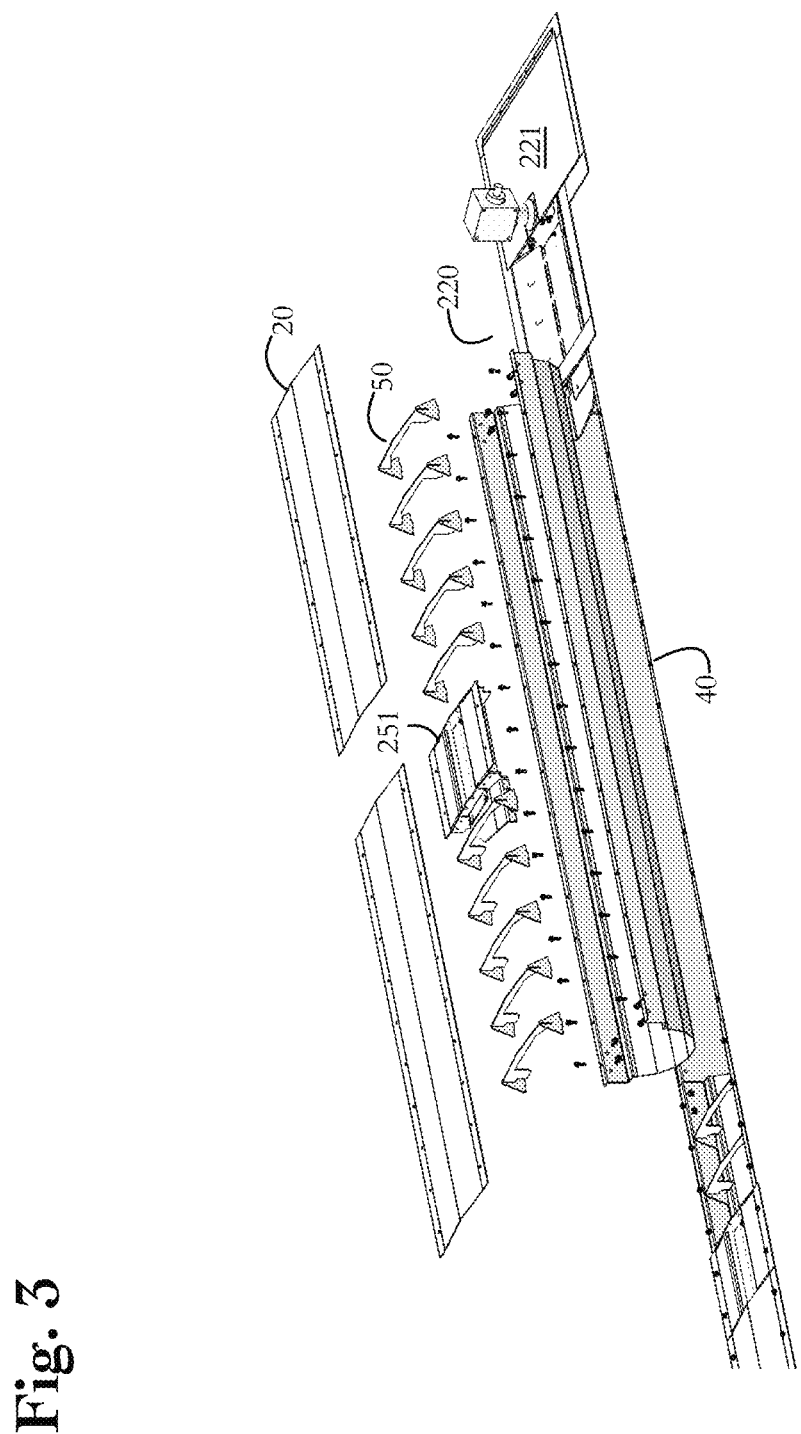
FIG. 3 shows an exploded view of the components of a portion of the conveyor of FIG. 1.

The midpan 30 is received into a return trough 40, as shown in FIG. 3. The return trough 40 contains a portion of the conveyor belt 5 as it returns empty after discharging the grain. The midpan 30 can be removably mounted to the return trough 40 in order to allow the user to clean any debris that settled to the bottom of the return trough 40. Also shown in FIG. 3 is the central pit cover 221. The central pit cover 221 covers the central pit maintenance area and belt return over the roller 228.

Figure 4:
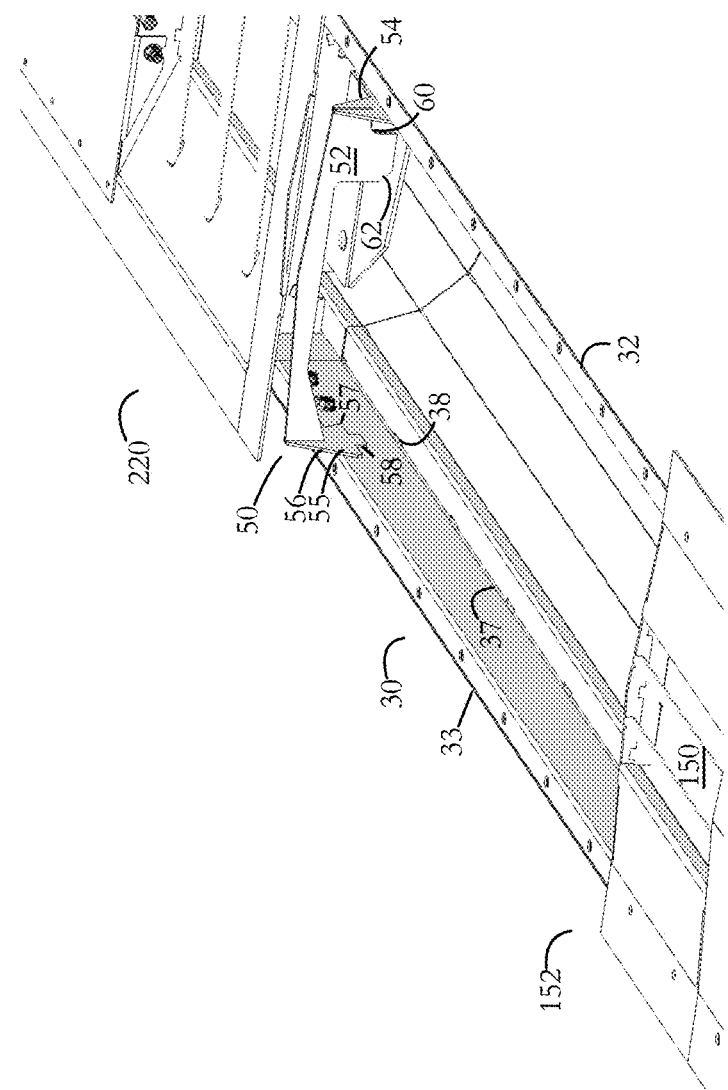
FIG. 4 shows a detailed side perspective view showing the relationship between a rib and the midpan of the conveyor of FIG. 1.

In order to support the cover 20 along the longitudinal length of the bin unload conveyor 10, the ribs 50 are longitudinally spaced apart at a predetermined interval, as shown in FIG. 4. In order to facilitate this spacing—and to assist the maintenance and installation of the cover and ribs—a plurality of rib slots 38 are provided on both lateral sides of the midpan 30. The rib slots 38 are shown on the third internal ledge 37 and the first internal ledge 34. Each rib has a rib tab 58 on the first rib end 54 and the second rib end 55. The rib tab 58 extends downwardly and is received by the rib slot 38. The rib tab 58 also cooperates with the first rib support flange 56 and the second rib support flange 57 to maintain the rib in an upright position during installation and maintenance.

Figure 5:
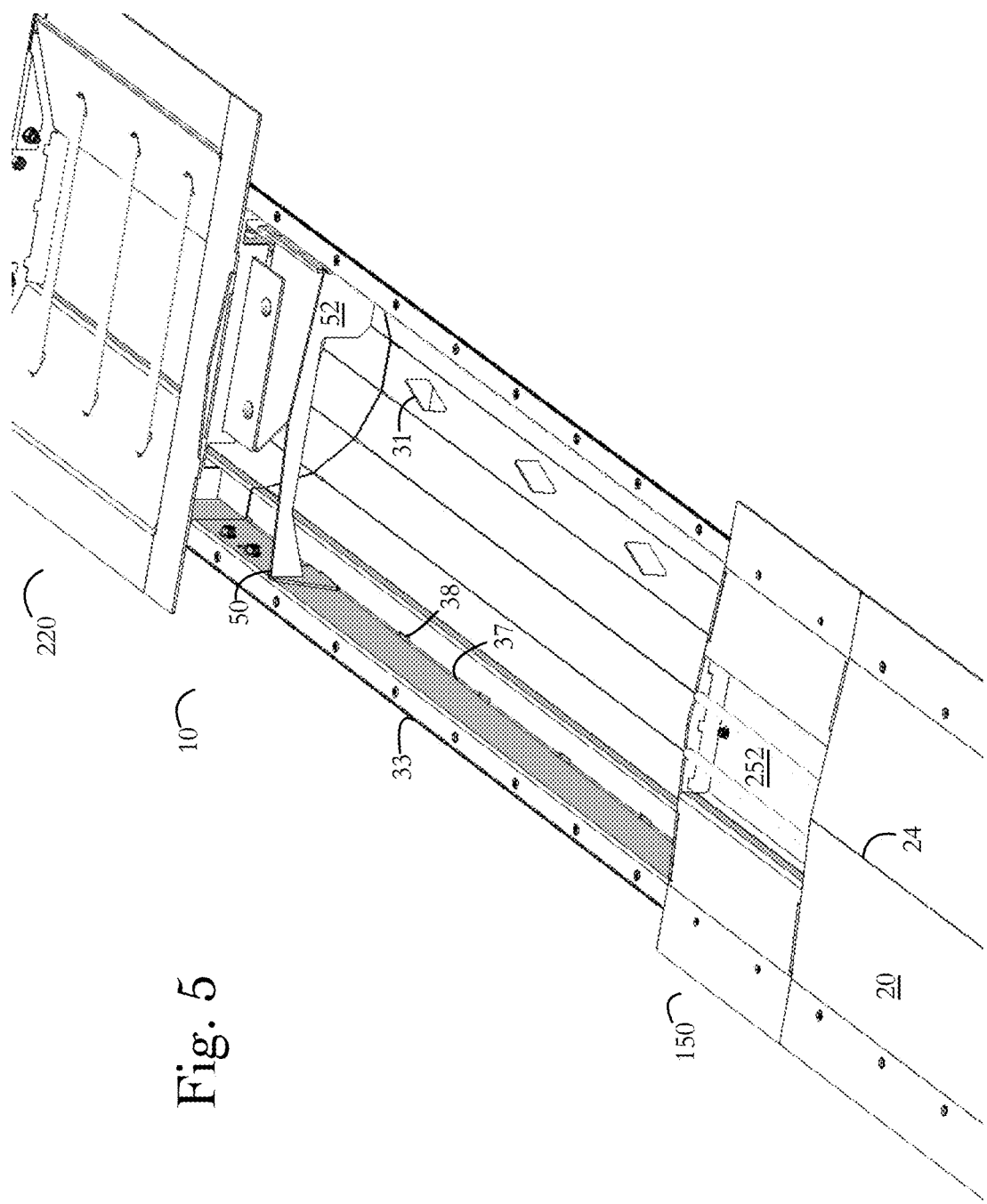
FIG. 5 shows a top perspective view of the conveyor of FIG. 1 having the cover and several ribs removed.

Any residual grain, dust, or debris that accumulates around the belt and settle into the midpan 30 can be removed to the return trough 40 through the cleanout aperture 31, as shown in FIG. 5. The cleanout aperture 31 is disposed in the bottom of the midpan 30. This provides a passageway for any residual grain, dust, or debris to fall through to the return trough 40 to prevent interference with the belt 5 movement.

Figure 6:
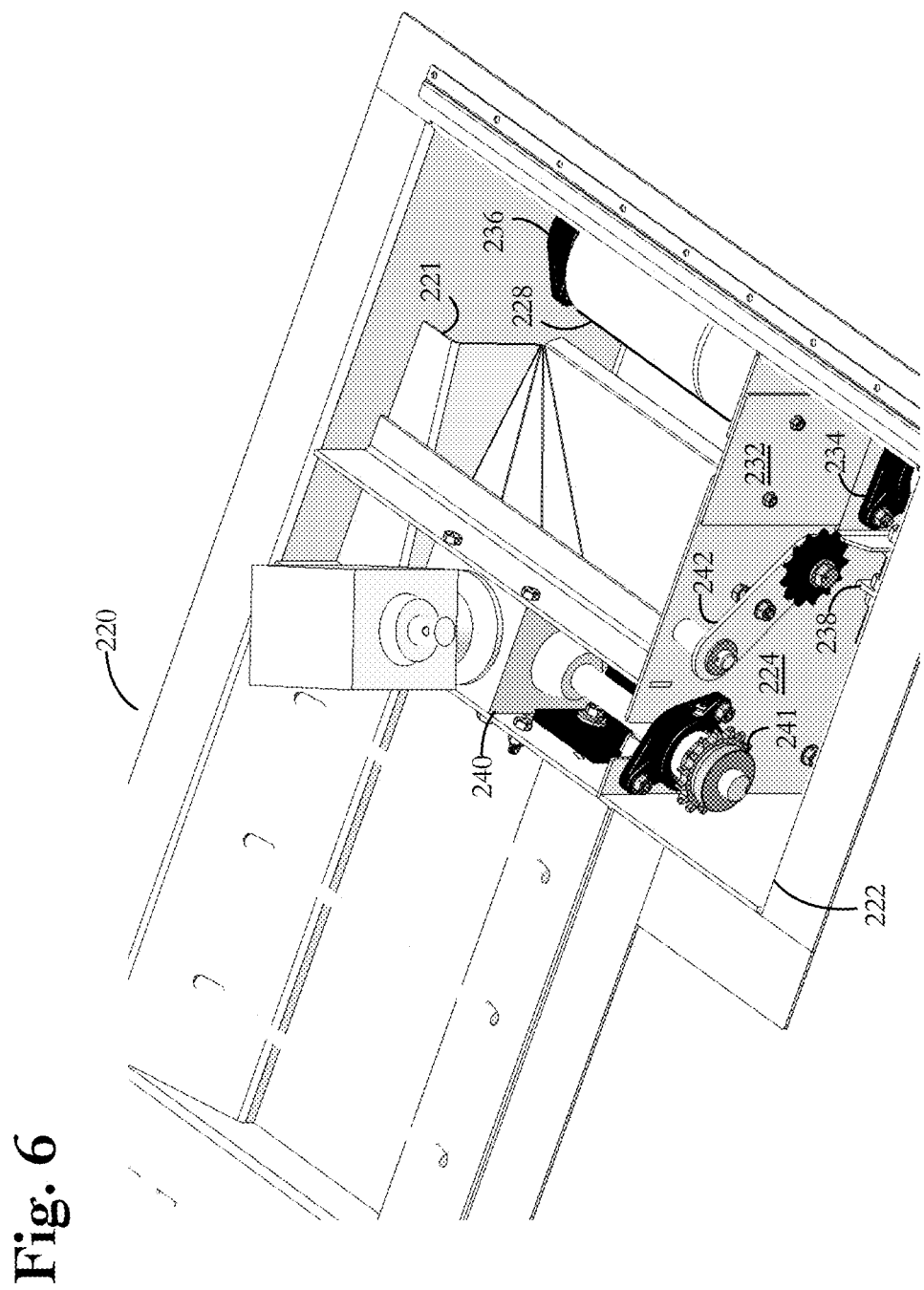
FIG. 6 shows a detailed top side perspective view of the center well, having the cover removed to show the service access portion of the conveyor of FIG. 1.

One advantage of the current disclosure is that maintenance can be performed while the conveyor belt 5 remains installed in the grain bin. FIG. 6 shows the internal portion of the central pit 220 with the central pit cover 221 removed. Removing the central pit cover 221 allows the user access to perform maintenance on the roller 228, first bearing 234, second bearing 236, belt 5, clutch mechanism 242, sweep drive assembly 240, sweep drive sprocket 241, and belt tracking mechanism 238. Additional portions of the belts are accessible for maintenance by removing the cover 20 and the midpan 30.

Figure 8:
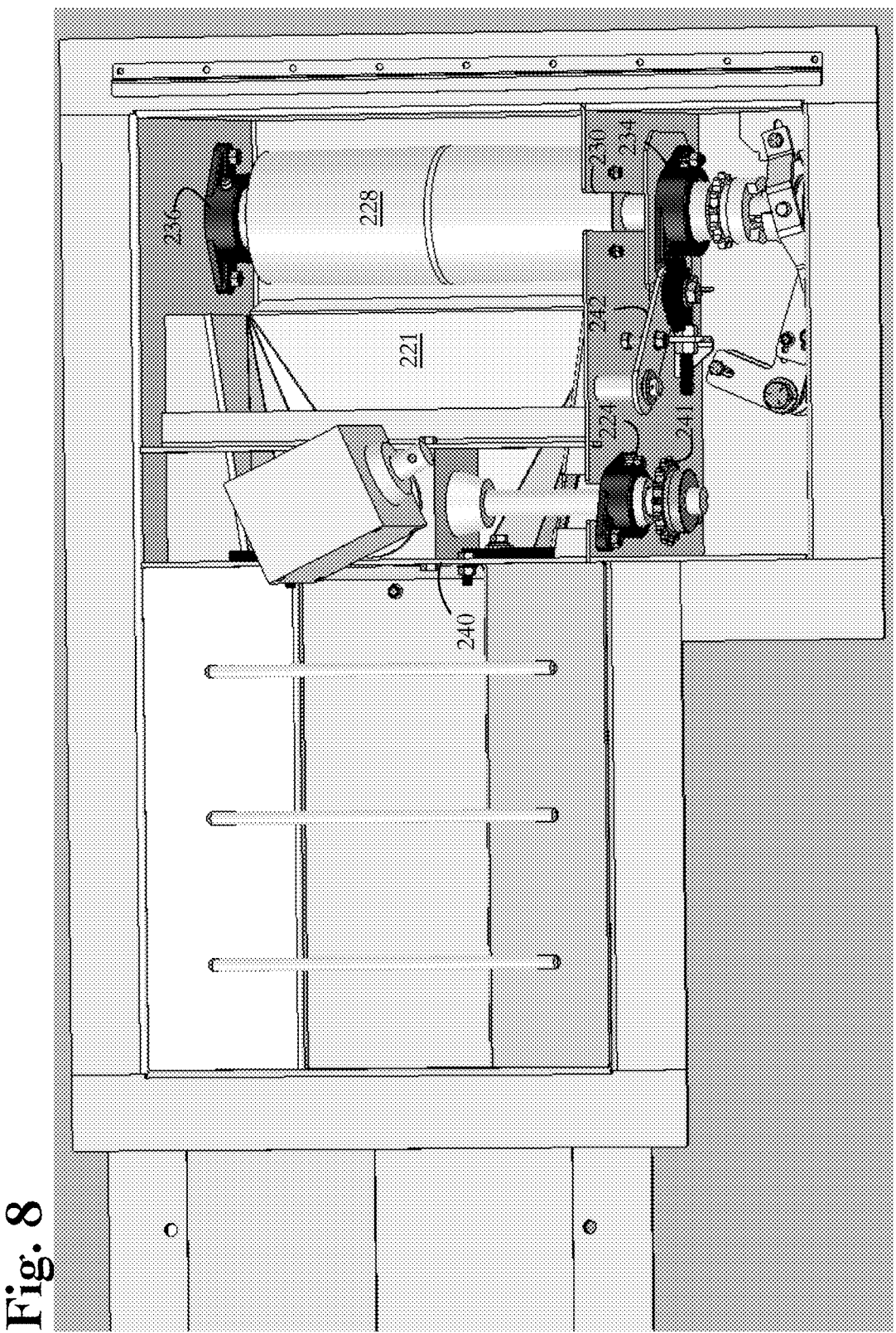
FIG. 8 shows a higher perspective view of the center well and the service access portion of the conveyor of FIG. 1.

In order to access and replace the first bearing 234, the central pit cover 221 located above the roller 228 is removed. The bolts holding the first bearing 234 to the access support wall 224 are removed. The access support wall 224 separates the belt return portion 223 of the central pit 220 from the service access portion 222. Within the service access portion 222, the sprocket connecting the sweep drive assembly 240 is disconnected. The lock collar 235 is loosened. The roller is then freed to slide horizontally. The roller can then be pivoted to the side, providing sufficient clearance to remove the roller from the second bearing 236. In order to remove the roller, the roller slot cover 232 is removed. The roller slot 230 is a vertical slot in the access support wall 224, which is illustrated in FIG. 8. Removing the roller slot cover 232 from the roller slot 230 allows the user to insert or remove the roller 228 for maintenance or installation purposes. Removing the roller 228 allows the user to access the second bearing 236. The second bearing 236 is bolted to the surface of an interior wall of the central pit 220. By mounting the second bearing 236 to the interior surface, all maintenance parts can be accessed without disturbing the floor of the grain bin or removing the bin unload conveyor. All of this maintenance can be accomplished with the bin unload conveyor maintained in place.

Figure 7:
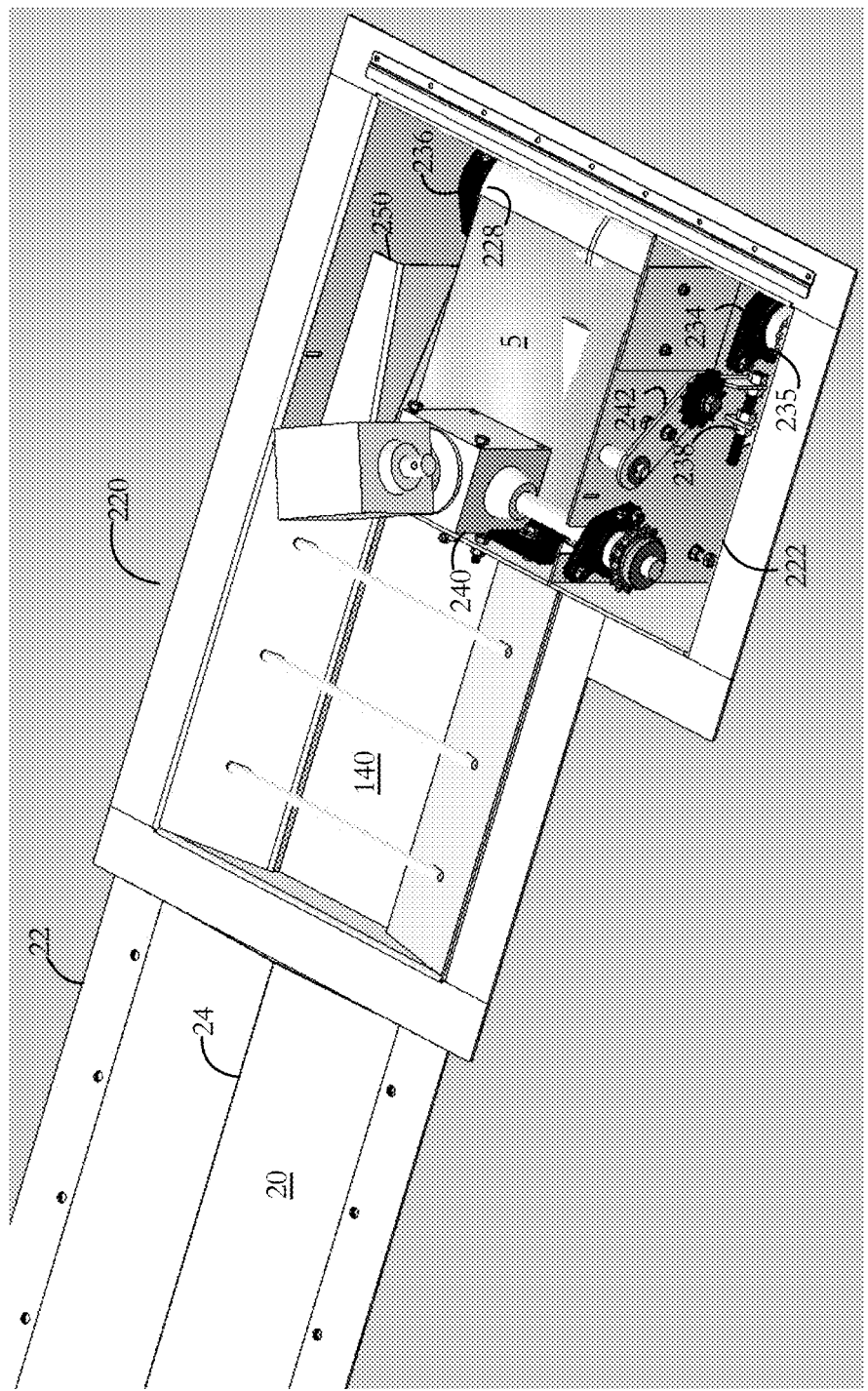
FIG. 7 shows another top view of the center well and service access portion of the conveyor of FIG. 1.

Other maintenance that can be required with belt conveyors is tracking of the belt 5. The user can access the tracking mechanism 238 within the service access portion 222 of the central pit 220. The tracking mechanism is best shown in FIG. 7. The tracking mechanism is mounted to the access support wall 224 on the service access portion 222 side. Adjusting the tracking mechanism 238 moves the roller 228 to properly direct the belt and prevent the belt from rubbing against the side walls.

Additional maintenance that can be required with belt conveyors include belt splicing to repair a section of the belt 5. By removing the cover 20, the user can access the belt to perform belt splicing and other belt repairs. Additionally, the use can access the belt in the return trough by removing the midpan.

Shown in the FIG. 1 is a portion of the bin unload conveyor 10 between the central pit 220 and an intermediate pit 252. The central pit 220 is shown without the central pit cover 221 in order to reveal the mechanisms accessible within the central pit. A central gate 140 selective opens and closes the grain opening 145 for the central pit 220. Grain is directed to the grain opening 145 via the sloped walls 142, 143. The sloped walls 142, 143 are downwardly and inwardly sloped to direct the grain toward the grain opening 145. A plurality of bars 144 prevent large chunks of grain and other large debris from entering the grain opening 145. Large chunks—frozen or otherwise bound together—can interfere with proper operation of the bin unload conveyor 10.

Also shown in FIG. 2 is a sliding gate guide 158. The sliding gate guide 158 supports the intermediate gate 252 when the gate is open above the intermediate well 250. The sliding gate guide 158 is mounted to the gate housing 251. The gate housing 251 has an opening and slanted walls leading into the opening to facilitate grain entering into the conveyor for transporting grain out of the grain bin. The bin unloading system can have any number of intermediate wells, gates, and gate housings depending on the diameter of the grain bin 252. The sliding gate guide 158 also prevents the gate from interfering with the belt 5 during operation of the bin unload conveyor 10. A similar sliding gate guide is provided for the central gate 140 or for additional intermediate gates.

As shown in FIG. 1 is a backstop 226 for preventing grain from backflowing into the belt return portion 223 of the central pit 220. The lower portion of the backstop 226 matches the curvilinear shape of the belt 5 as it progresses past the transition assembly 225. The belt 5 has a flat orientation as the belt is wrapped about the roller 228. The transition assembly 225 guides the belt from the flat orientation to the curvilinear orientation during material transfer as the belt passes from the center of the grain bin to the exterior of the grain bin through the midpan 30—the midpan having a complementary curvilinear cross section. As the grain flows through the central gate opening, the grain can begin to slide backwards into the tail of the conveyor—toward the belt return portion 223 of the central pit 220—rather than be carried forward and out of the grain bin. The backstop 226 can comprise a rubber, ultra-high molecular weight plastic, or steel. The backstop 226 is generally U-shaped and is mounted at the downstream end of the transition assembly 225. The backstop 226 has a first raised top portion, a second raised top portion, and a top central opening. The backstop 226 is mounted to an upstream wall of the central gate housing. The backstop 226 is mounted at a downstream portion of the transition assembly 225—downstream referring to the movement path of the conveyor belt.

It is also contemplated that the pitch of the cover 20 may be flat. In a flat cover, the cover 20 would not have a central peak 24. The truss portion of the plurality of ribs would be formed with a flat top to accommodate the flat cover 20.

We claim:

1. An unloading conveyor system for a grain bin comprising:
   a. a central pit;
   b. an access support wall dividing the central pit into:
      i. a belt return portion;
      ii. a service access portion; and
   c. a roller slot disposed within the access support wall.

2. The unloading conveyor system of claim 1 further comprising:
   a. a roller slot cover mounted to the access support wall to cover the roller slot.

3. The unloading conveyor system of claim 1 further comprising:
   a. a roller mounted within the belt return portion wherein the roller may be pivotally removed through the roller slot.

4. The unloading conveyor system of claim 3 further comprising:
   a. a belt disposed about the roller;
   b. a central gate having a closed position to cover a portion of the central pit and an open position to allow grain to enter the portion of the central pit; and
   c. a sliding gate guide to prevent the central gate from interfering with the belt when the central gate is in the open position.

5. An unloading conveyor system for a grain bin comprising:
   a. a central pit;
   b. an access support wall dividing the central pit into:
      i. a belt return portion; and
      ii. a service access portion;
   c. a first bearing mount mounted to the access support wall;
   d. a second bearing mount mounted to an interior surface of the belt return portion;
   e. a roller mounted to the first bearing mount and the second bearing mount; and
   f. a roller slot disposed within the access support wall wherein the roller may be pivotally moved through the roller slot.

6. The unloading conveyor system of claim 5 where the first bearing mount is mounted within the service access portion.

7. The unloading conveyor system of claim 5 where the first bearing mount and the roller are accessible for service through the service access portion of the central pit.

8. The unloading conveyor system of claim 5, where the central pit further comprises:
   a. a center well; and
   b. a backstop mounted between the center well and the belt return portion.

9. The unloading conveyor system of claim 8, where the backstop is made from rubber.

10. The unloading conveyor system of claim 8 where the backstop has a curvilinear bottom edge.

11. The unloading conveyor system of claim 10, where the curvilinear bottom edge is complementary to a midpan.

12. An unloading conveyor system for a grain bin comprising:
    a. a central pit having:
       i. a center well;
       ii. a belt return portion; and
    b. a grain backstop mounted between the center well and the belt return portion.

13. The unloading conveyor system of claim 12, where the backstop is made from rubber.

14. The unloading conveyor system of claim 12, where the backstop has a curvilinear bottom edge.

15. The unloading conveyor system of claim 14, where the curvilinear bottom edge is complementary to a midpan.

16. The unloading conveyor system of claim 12 further comprising:
    a. an access support wall dividing the belt return portion from a service access portion.

17. The unloading conveyor system of claim 16 further comprising:
    a. a roller slot disposed within the access support wall wherein a roller may be pivotally removed from the belt return portion through the roller slot.

18. The unloading conveyor system of claim 17 further comprising:
    a. a roller slot cover mounted to the access support wall to cover the roller slot.

19. The unloading conveyor system of claim 12, wherein the grain backstop is mounted vertically within the central pit and is generally U-shaped.

20. The unloading conveyor system of claim 12, wherein the grain backstop is structured to prevent material from entering the belt return portion.

* * * * *